US012749941B2

(12) United States Patent
Morley et al.

(10) Patent No.: US 12,749,941 B2
(45) Date of Patent: Sep. 29, 2026

(54) BRUSHLESS MOTOR

(71) Applicant: Dyson Technology Limited, Wiltshire (GB)

(72) Inventors: Harry Alexander Morley, Bristol (GB); Thomas Richard Stafford, Bath (GB); Japhet Lee Cordova Morabe, Singapore (SG); Christopher David Townend, Gloucester (SG)

(73) Assignee: Dyson Technology Limited, Malmesbury (GB)

( * ) Notice: Subject to any disclaimer, the term of this patent is extended or adjusted under 35 U.S.C. 154(b) by 248 days.

(21) Appl. No.: 18/578,441

(22) PCT Filed: Jul. 12, 2022

(86) PCT No.: PCT/GB2022/051804
§ 371 (c)(1),
(2) Date: Jan. 11, 2024

(87) PCT Pub. No.: WO2023/285809
PCT Pub. Date: Jan. 19, 2023

(65) Prior Publication Data
US 2024/0297547 A1 Sep. 5, 2024

(30) Foreign Application Priority Data
Jul. 13, 2021 (GB) ...................................... 2110081

(51) Int. Cl.
*H02K 3/52* (2006.01)
*A47L 5/24* (2006.01)
(Continued)

(52) U.S. Cl.
CPC ................ *H02K 3/522* (2013.01); *A47L 5/24* (2013.01); *H02K 5/1732* (2013.01); *H02K 7/083* (2013.01);
(Continued)

(58) Field of Classification Search
CPC .......... H02K 5/08; H02K 5/18; H02K 15/142; H02K 2203/12
See application file for complete search history.

(56) References Cited

U.S. PATENT DOCUMENTS 2,506,404 A 5/1950 Woodfield et al.
2,926,051 A 2/1960 Cazier et al.
(Continued)

FOREIGN PATENT DOCUMENTS

CH 240887 A 1/1946
CN 204145092 U 2/2015
(Continued)

OTHER PUBLICATIONS

International Search Report and Written Opinion received for PCT Patent Application No. PCT/GB2022/051801, mailed on Oct. 17, 2022, 10 pages.
(Continued)

*Primary Examiner* — Oluseye Iwarere
*Assistant Examiner* — Masoud Vaziri
(74) *Attorney, Agent, or Firm* — Tucker Ellis LLP; Michael G. Craig

(57) ABSTRACT

A brushless motor has a stator assembly, and a frame within which the stator assembly is housed. The stator assembly has a plurality of stator core sub-assemblies, each having a stator core, a bobbin attached to the stator core, and a winding wound about the bobbin. Each bobbin has a connection portion for connecting to an adjacent bobbin in the stator assembly, and the frame is overmoulded to the stator assembly.

22 Claims, 12 Drawing Sheets

(51) Int. Cl.
*H02K 5/173* (2006.01)
*H02K 7/08* (2006.01)
*H02K 15/12* (2006.01)
*H02K 21/16* (2006.01)

(52) U.S. Cl.
CPC ............ *H02K 15/12* (2013.01); *H02K 21/16* (2013.01); *H02K 2203/12* (2013.01)

(56) References Cited

U.S. PATENT DOCUMENTS 3,145,317 A 8/1964 Blohm et al.
3,435,930 A 4/1969 Scheuerer
4,219,330 A 8/1980 Jaremus
4,486,055 A 12/1984 Rohloff
4,645,361 A 2/1987 Lakin
4,981,390 A 1/1991 Cramer et al.
5,059,042 A 10/1991 Grierson
5,134,327 A 7/1992 Sumi et al.
5,268,607 A 12/1993 Mcmanus
5,293,665 A 3/1994 Worwag
5,829,891 A 11/1998 Beaman
6,002,185 A 12/1999 Nakao et al.
6,166,468 A 12/2000 Suzuki et al.
6,849,977 B2 2/2005 Walther et al.
6,903,475 B2 6/2005 Ortt et al.
6,910,654 B2 6/2005 Kawano et al.
7,036,206 B2 5/2006 Worden et al.
7,049,715 B2 5/2006 Neal
7,067,952 B2 6/2006 Neal
7,487,570 B2 2/2009 Kim et al.
7,588,444 B2 9/2009 Kataoka et al.
7,604,414 B2 10/2009 Verhoeven
7,800,265 B2 9/2010 Nishikawa et al.
7,868,726 B2 1/2011 Asano
8,058,766 B2 11/2011 Hoshino et al.
8,368,261 B2 2/2013 Ishizue et al.
8,368,262 B2 2/2013 Ishizue et al.
8,459,875 B2 6/2013 Otsuka
8,513,843 B2 8/2013 Kinugawa
8,536,744 B2 9/2013 Nagayama et al.
8,636,479 B2 1/2014 Kenyon et al.
8,845,202 B2 9/2014 Teimel
9,054,563 B2 6/2015 Matsunaga et al.
9,263,919 B2 2/2016 King et al.
9,293,966 B2 3/2016 Marioni
9,337,696 B2 5/2016 Funakoshi et al.
9,391,493 B2 7/2016 Leung et al.
9,601,966 B2 3/2017 Furukawa et al.
9,614,403 B2 4/2017 Yoshida et al.
9,702,403 B2 7/2017 Beck et al.
9,812,920 B2 11/2017 Mckinzie et al.
10,186,916 B2 1/2019 Asakura et al.
10,456,000 B2 10/2019 Rukavina
10,811,925 B2 10/2020 Hnni et al.
11,482,913 B2 10/2022 Sumi
2004/0051417 A1 3/2004 Yamazaki et al.
2004/0056537 A1 3/2004 Du et al.
2004/0070289 A1 4/2004 Worden et al.
2004/0134708 A1 7/2004 Tanaka et al.
2005/0093379 A1 5/2005 Tanabe et al.
2006/0181168 A1 8/2006 Hargraves et al.
2007/0230839 A1 10/2007 Childe et al.
2007/0236099 A1* 10/2007 Kim .................... H02K 15/095 310/180
2008/0084131 A1 4/2008 Yamawaki et al.
2009/0080823 A1 3/2009 Bauch et al.
2009/0119871 A1 5/2009 Dilger et al.
2009/0167101 A1 7/2009 Saga et al.
2010/0156231 A1* 6/2010 Lee ....................... H02K 1/148 310/179
2011/0187221 A1 8/2011 Dreisbach
2012/0007453 A1 1/2012 Leiber et al.
2012/0019080 A1 1/2012 Kottmyer et al.
2013/0020885 A1 1/2013 Hsieh et al.
2013/0038146 A1 2/2013 Hofmann et al.
2013/0052051 A1 2/2013 Clothier et al.
2013/0221889 A1 8/2013 Kim et al.
2013/0229071 A1 9/2013 Lau et al.
2013/0249330 A1* 9/2013 King ...................... H02K 1/141 310/43
2013/0263439 A1 10/2013 Brandau et al.
2014/0132096 A1* 5/2014 Takeda ..................... H02K 3/52 310/71
2014/0271280 A1 9/2014 Ley et al.
2014/0319955 A1* 10/2014 Leaver .................. H02K 3/345 310/208
2014/0328674 A1 11/2014 Jacob et al.
2014/0341759 A1 11/2014 Calico et al.
2015/0040707 A1 2/2015 Hong
2015/0194852 A1* 7/2015 Kim ......................... H02K 3/30 310/43
2015/0219149 A1 8/2015 Teimel
2015/0379897 A1 12/2015 Nadig et al.
2016/0285339 A1 9/2016 Smith et al.
2017/0093252 A1 3/2017 Otsubo
2017/0159707 A1 6/2017 Yamawaki et al.
2017/0170693 A1* 6/2017 Dymond ................ H02K 3/325
2017/0256995 A1* 9/2017 Lam ..................... H02K 15/022
2017/0338713 A1 11/2017 Tomizawa et al.
2018/0163747 A1 6/2018 Hayamitsu et al.
2018/0266440 A1 9/2018 Shiozawa
2018/0303578 A1 10/2018 Bierbaum et al.
2018/0351430 A1 12/2018 Inada et al.
2018/0363669 A1* 12/2018 Sullivan ................. H02K 7/083
2018/0366996 A1* 12/2018 Celik ....................... H02K 1/17
2018/0366997 A1* 12/2018 Le Mentec ........... F04D 29/403
2018/0366999 A1* 12/2018 Clothier ................ H02K 7/083
2018/0375400 A1 12/2018 Ahrens et al.
2019/0115807 A1 4/2019 Wells
2019/0157922 A1 5/2019 Tangudu et al.
2019/0165642 A1 5/2019 Kajikawa et al.
2020/0119599 A1 4/2020 Tanabe et al.
2020/0204032 A1 6/2020 Zhong et al.
2020/0412198 A1* 12/2020 Dymond .................. H02K 9/06
2021/0207617 A1* 7/2021 Johnson .................. F04D 17/06
2021/0367476 A1* 11/2021 Stafford ................... H02K 5/24
2022/0325722 A1 10/2022 Barnes et al.
2022/0337101 A1* 10/2022 Peng ...................... H02K 37/04

FOREIGN PATENT DOCUMENTS

CN 205195452 U 4/2016
CN 208489701 U 2/2019
CN 110126181 A 8/2019
CN 111564915 A 8/2020
CN 211630057 U 10/2020
DE 0870576 C 3/1953
DE 2939560 A1 4/1981
DE 8900708 U1 5/1990
DE 19818059 A1 10/1999
DE 10325522 A1 12/2004
DE 102010011630 A1 9/2011
DE 102010036828 A1 2/2012
DE 102013219119 A1 3/2015
DE 102013114688 A1 6/2015
DE 102015112539 A1 2/2017
DE 102016206657 A1 10/2017
DE 102017207526 A1 11/2017
DE 102019131496 A1 5/2020
EP 0425182 A1 5/1991
EP 1528655 A2 5/2005
EP 2064979 B1 7/2009
EP 2410635 A2 1/2012
EP 2557665 A1 2/2013
EP 2902648 A1 8/2015
EP 3073619 A1 9/2016
EP 3306105 A1 4/2018
EP 3411940 A1 12/2018
EP 3487042 A1 5/2019
EP 3496238 A1 6/2019
GB 0173649 A 1/1922
GB 0823781 A 11/1959

(56) References Cited

FOREIGN PATENT DOCUMENTS

| | | | |
|---|---|---|---|
| GB | 1509605 | A | 5/1978 |
| GB | 2325787 | A | 12/1998 |
| GB | 2406146 | A | 3/2005 |
| GB | 2493975 | A | 2/2013 |
| GB | 2495544 | A | 4/2013 |
| GB | 2500580 | A | 10/2013 |
| GB | 2545269 | A | 6/2017 |
| GB | 2545413 | A | 6/2017 |
| GB | 2553242 | A | 2/2018 |
| GB | 2571553 | A | 9/2019 |
| GB | 2577546 | A | 4/2020 |
| GB | 2586844 | A | 3/2021 |
| JP | 47-038240 | U | 12/1972 |
| JP | 56-086047 | A | 7/1981 |
| JP | 58-029821 | U | 2/1983 |
| JP | 58-222745 | A | 12/1983 |
| JP | 60-154622 | U | 10/1985 |
| JP | 63-190310 | A | 8/1988 |
| JP | 05-084183 | A | 4/1993 |
| JP | 06-284619 | A | 10/1994 |
| JP | 07-245895 | A | 9/1995 |
| JP | 08-098441 | A | 4/1996 |
| JP | 08-203720 | A | 8/1996 |
| JP | 09-065604 | A | 3/1997 |
| JP | 09-135548 | A | 5/1997 |
| JP | 10-174331 | A | 6/1998 |
| JP | 10-271719 | A | 10/1998 |
| JP | 2818022 | B2 | 10/1998 |
| JP | 11-332204 | A | 11/1999 |
| JP | 2000-041365 | A | 2/2000 |
| JP | 2000-156952 | A | 6/2000 |
| JP | 2000-166193 | A | 6/2000 |
| JP | 2000-217753 | A | 8/2000 |
| JP | 2001-112206 | A | 4/2001 |
| JP | 2001-178066 | A | 6/2001 |
| JP | 2001-211599 | A | 8/2001 |
| JP | 2001-258186 | A | 9/2001 |
| JP | 2002-027694 | A | 1/2002 |
| JP | 2002-154133 | A | 5/2002 |
| JP | 2002-315257 | A | 10/2002 |
| JP | 2003-103558 | A | 4/2003 |
| JP | 2003-189533 | A | 7/2003 |
| JP | 2003-244908 | A | 8/2003 |
| JP | 2004-180396 | A | 6/2004 |
| JP | 2006-174581 | A | 6/2006 |
| JP | 2006-325309 | A | 11/2006 |
| JP | 2007506399 | A | 3/2007 |
| JP | 2008-079467 | A | 4/2008 |
| JP | 4797429 | B2 | 10/2011 |
| JP | 2012-019567 | A | 1/2012 |
| JP | 4985804 | B2 | 7/2012 |
| JP | 4993918 | B2 | 8/2012 |
| JP | 2012-193646 | A | 10/2012 |
| JP | 2013-160267 | A | 8/2013 |
| JP | 2015-007451 | A | 1/2015 |
| JP | 2015-033211 | A | 2/2015 |
| JP | 2016-008579 | A | 1/2016 |
| JP | 2016-056828 | A | 4/2016 |
| JP | 5918392 | B2 | 5/2016 |
| JP | 2016-205336 | A | 12/2016 |
| JP | 2017-158339 | A | 9/2017 |
| JP | 2018105269 | A | 7/2018 |
| JP | 6819760 | B2 | 1/2021 |
| KR | 10-1998-0020553 | A | 6/1998 |
| KR | 20100073449 | A | 7/2010 |
| KR | 20140135778 | A | 11/2014 |
| KR | 20170104402 | A | 9/2017 |
| KR | 20180083416 | A | 7/2018 |
| KR | 20200013047 | A | 2/2020 |
| KR | 20200069339 | A | 6/2020 |
| KR | 20200110809 | A | 9/2020 |
| WO | 92/08271 | A1 | 5/1992 |
| WO | 97/40569 | A1 | 10/1997 |
| WO | 2005/029680 | A1 | 3/2005 |
| WO | 2006/067736 | A1 | 6/2006 |
| WO | 2008/050637 | A1 | 5/2008 |
| WO | 2012/007858 | A1 | 1/2012 |
| WO | 2014/103758 | A1 | 7/2014 |
| WO | 2016/208629 | A1 | 12/2016 |
| WO | 2017/098202 | A1 | 6/2017 |
| WO | 2017/146031 | A1 | 8/2017 |
| WO | 2017/149820 | A1 | 9/2017 |
| WO | 2020/065254 | A1 | 4/2020 |

OTHER PUBLICATIONS

International Search Report and Written Opinion received for PCT Patent Application No. PCT/GB2022/051802, mailed on Oct. 20, 2022, 13 pages.
International Search Report and Written Opinion received for PCT Patent Application No. PCT/GB2022/051803, mailed on Oct. 17, 2022, 13 pages.
International Search Report and Written Opinion received for PCT Patent Application No. PCT/GB2022/051804, mailed on Oct. 14, 2022, 10 pages.
International Search Report and Written Opinion received for PCT Patent Application No. PCT/GB2022/051805, mailed on Oct. 25, 2023, 12 pages.
International Search Report and Written Opinion received for PCT Patent Application No. PCT/GB2022/051806, mailed on Oct. 25, 2022, 12 pages.
Search Report received for GB Application No. 2110082.1, mailed on Dec. 15, 2021, 2 pages.
Search Report received for GB Application No. 2110085.4, mailed on Dec. 15, 2021, 2 pages.
Search Report received for GB Application No. 2210023.4, mailed on Jan. 3, 2023, 2 pages.
Search Report received for GB Application No. 2110080.5, mailed on Dec. 17, 2021, 1 page.
Search Report received for GB Application No. 2110081.3, mailed on Dec. 21, 2021, 2 pages.
Search Report received for GB Application No. 2210024.2, mailed on Jan. 3, 2023, 1 page.

* cited by examiner

BRUSHLESS MOTOR

CROSS-REFERENCE TO PRIOR APPLICATION

This application is a § 371 National Stage Application of PCT International Application No. PCT/GB2022/051804 filed Jul. 12, 2022, which claims the priority of United Kingdom Application No. 2110081.3, filed Jul. 13, 2021, each of which are herein incorporated by reference in their entirety.

FIELD OF THE INVENTION

The present invention relates to a brushless motor, and to a method of manufacturing a brushless motor.

BACKGROUND OF THE INVENTION

There is a general desire to improve electric machines, such as brushless motors, in a number of ways. For example, improvements may be desired in terms of size, weight, power density, manufacturing cost, efficiency, reliability, and noise.

SUMMARY OF THE INVENTION

According to a first aspect of the present invention there is provided a brushless motor comprising a stator assembly, and a frame within which the stator assembly is housed, wherein the stator assembly comprises a plurality of stator core sub-assemblies each comprising a stator core, a bobbin attached to the stator core, and a winding wound about the bobbin, each bobbin comprising a connection portion for connecting to an adjacent bobbin in the stator assembly, and the frame being overmoulded to the stator assembly.

The brushless motor according to the first aspect of the present invention may be advantageous as the connection portions of the bobbins may aid with alignment of the stator core sub-assemblies during overmoulding of the frame to the stator assembly in manufacture.

Overmoulding the frame to the stator assembly may, for example, remove the need for the stator core sub-assemblies to be individually adhered to the frame, and may provide a manufacturing process with fewer steps than a manufacturing process in which the stator core sub-assemblies are individually adhered to the frame. Overmoulding the frame to the stator assembly may, in some examples, provide increased thermal transfer from the stator core sub-assemblies to the frame compared to embodiments where stator core sub-assemblies are adhered to the frame.

Overmoulding the frame to the stator assembly may provide a brushless motor having a greater overall stiffness than, for example, a brushless motor in which the stator core sub-assemblies are individually adhered to the frame. Overmoulding the frame to the stator assembly may also facilitate manufacture of a brushless motor having a generally sealed bearing cartridge compared to, for example, an arrangement where the frame has apertures into which individual stator core sub-assemblies are mounted. A sealed bearing cartridge may inhibit airflow from entering the region of the frame in which the bearings are housed in use, which may reduce emissions.

Each bobbin may comprise first and second connection portions, the first connection portion located at a first side of the bobbin, and the second connection portion located at a second, opposite, side of the bobbin. Thus the bobbin may be connected to adjacent bobbins in the stator assembly during manufacture. The connection portion(s) may comprise corresponding projections and recesses. The connection portions may be shaped to inhibit radial and/or circumferential separation of adjacent bobbins when connected. The connection portions may be shaped to allow relative axial movement between adjacent bobbins when connected. This may allow for adjustment of the relative axial positioning of the bobbins on a jig during overmoulding of the frame to the stator assembly, if needed.

Each bobbin may be overmoulded to a respective stator core. Overmoulding the bobbins to their respective stator cores may enable bobbins of a smaller wall thickness than an arrangement in which bobbins are formed as separate parts and then connected to stator cores, which may allow for a higher winding fill factor when winding the stator cores due to increased available space.

The bobbins may comprise a first material, and the frame may comprise a second material different to the first material. This may enable the materials for the bobbins and the frame to be chosen appropriately for their desired functionality. The frame may comprise a thermoplastic material. The frame may comprise a material having a thermal conductivity, for example a through-plane thermal conductivity, of at least 1.5 W/mK. The frame may comprise a material having a Young's modulus of at least 10-45 GPa, for example in the region of 25 GPa. Each bobbin may be overmoulded to a respective stator core in a respective first overmoulding process, and the frame may be overmoulded to the stator assembly in a second overmoulding process different to the first overmoulding process. This may enable creation of the individual stator sub-assemblies before subsequent overmoulding of the frame to the stator assembly.

The bobbins may comprise a wall thickness of less than 0.6 mm, for example around 0.4 mm, in a region wound by the windings. The bobbins may comprise guides for guiding windings during winding of the bobbins.

The stator assembly may comprise first and second terminals to which the windings are attached, and a sleeve overmoulded to the first and second terminals. Overmoulding the sleeve to the first and second terminals may provide support to the terminals during attachment, for example fusing, of the windings to the terminals, and may support the first and second terminals during overmoulding of the frame to the stator assembly, thereby providing more consistent wall thicknesses between brushless motors manufactured on the same assembly line. Overmoulding the frame to the stator assembly, which includes the windings and the first and second terminals, may provide support to the windings and fused joints in the manufacture brushless motor, which may result in reduced failures in use due to impact/shock and/or fatigue and/or vibration. Overmoulding the frame to the stator assembly, which includes the windings and the first and second terminals, may ensure that the assembly is insulated between the first and second terminals for the purposes of creepage and clearance.

The first and second terminals may comprise input and output electrical connections to the windings of the brushless motor.

The first and second terminals may be exposed through apertures in the sleeve, and the windings may be attached to the first and second terminals through the apertures. This may enable connection of the windings to the first and second terminals once the sleeve has been overmoulded to the first and second terminals. The sleeve may be overmoulded to the terminals in a third overmoulding process different to the first and second overmoulding processes. The sleeve and the frame may comprise the same material.

The sleeve may comprise a plurality of winding guides for guiding windings from the bobbins to the apertures. This may ensure correct location of the windings.

The sleeve may comprise a locating feature for locating the sleeve relative to the bobbins. The locating feature may comprise a projection to space the first and second terminals from the bobbins. The sleeve may comprise a plurality of locating features, each locating feature comprising a projection to space the first and second terminals from the bobbins.

The brushless motor may comprise a rotor assembly, the rotor assembly may comprise a shaft, a rotor core attached to the shaft, a first bearing attached to a first end of the shaft, and a second bearing attached to a second end of the shaft opposite to the first end of the shaft. The frame may define first and second bearing seats for the respective first and second bearings, and a channel within which the rotor core is located. In such a manner the frame may define a support structure within which the rotor assembly is located and held.

The rotor assembly may comprise an impeller for generating an airflow upon rotation of the rotor assembly, and the frame may define a shroud for the impeller. Using the overmoulded frame to define a shroud may provide reduced component count relative to an arrangement where the frame and the shroud comprise separate components.

The frame may be overmoulded to the stator assembly such that portions of the stator cores are exposed through the frame. This may provide improved magnetic and/or thermal characteristics.

The frame may be overmoulded to the stator assembly such that pole faces of the stator cores are exposed, for example defining part of a boundary wall of the channel within which the rotor assembly is located. This may provide reduce the effective airgap compared to, for example, an arrangement where the pole faces are overmoulded, and may provide improved flux linkage between the pole faces and the permanent magnet.

The frame may comprise a main body having protrusions, each protrusion overlying a respective stator core, and each protrusion comprising a region of increased radius relative to regions of the main body between adjacent stator cores of the stator assembly. This may provide a reduced thickness volume of material covering the stator assembly in the regions between adjacent stator cores compared to, for example, an arrangement where the frame has a constant radius whilst overlying the stator cores. The main body may be generally cylindrical in form, with the protrusions extending outwardly therefrom.

Each stator core may comprise a back, and first and second arms extending from the back. The frame may be overmoulded to the stator assembly such that portions of the back and the first and second arms of each stator core are exposed through the frame. In such a manner portions of the back and the first and second arms of each stator core may be exposed to airflow through the brushless motor in use, which may provide cooling of the stator cores. In some examples, at least 10% of each stator core is exposed through the frame. In some examples, no more than 30% of each stator core is exposed through the frame.

Each stator core may be generally C-shaped in form, and shoulders, for example regions of transition from the back to the first and second arms, of each C-shaped stator core may be exposed through the frame. Use of separate C-shaped stator cores, which are individually wound, may allow for a relatively high winding fill factor.

The frame may comprise a plurality of turbulators, for example a plurality of projections for generating vortices in airflow through the brushless motor in use. Creation of such vortices may provide improved thermal transfer away from the stator cores in use.

The turbulators may be formed during a process of overmoulding the frame to the stator assembly. Integrally forming the turbulators with the frame as part of the same overmoulding process may reduce a risk of separation of the turbulators from the frame in use compared to, for example, an arrangement in which the turbulators are adhered to the frame. Integrally forming the turbulators with the frame as part of the same overmoulding process may reduce the number of steps in manufacturing the brushless motor.

The frame may comprise a plurality of turbulators overlying the backs of the stator cores, for example overlying windings disposed on the backs of the stator cores. This may generate vortices in the region of the backs of the stator cores, which may aid with heat transfer away from the backs of the stator cores, for example heat transfer away from windings disposed on the backs of stator cores, in use.

The plurality of turbulators may be obliquely angled relative to an axis substantially parallel to a central longitudinal axis of the brushless motor. This may provide a compromise between generated vortices and generally laminar airflow through the brushless motor in use. The central longitudinal axis of the brushless motor may extend from an inlet end of the brushless motor to an outlet end of the brushless motor, and may, for example be located centrally through the shaft of the rotor assembly.

The plurality of turbulators may be angled between 45-75 degrees relative to the axis, for example at around 60 degrees relative to the axis. This may be particularly effective at generating vortices for appropriate heat transfer away from the backs of the stator cores. The angle may be measured between a trailing end of each turbulator, for example an end of each turbulator that is furthest toward the impeller, and the axis. The trailing end of each turbulator may be closer to the axis than a leading end of the turbulator.

A pitch to height ratio of each turbulator may be in the region of 8:1 to 12:1, for example around 10:1. This may be particularly effective at generating vortices for appropriate heat transfer away from the backs of the stator cores. A height of each turbulator may be in a region of 0.3 to 0.9 mm, for example around 0.6 mm. This may provide a cooling effect without significantly choking airflow through the brushless motor in use.

The plurality of turbulators may comprise a plurality of pairs of turbulators, each pair of turbulators arranged in a generally V-shaped formation. This may be particularly effective at generating vortices for appropriate heat transfer away from the backs of the stator cores. A first turbulator of a pair of turbulators may be arranged on a first side of a core back, and a second turbulator of the pair of turbulators may be arranged on a second side of the core back.

The frame may comprise a plurality of struts, each strut extending from a respective region of the frame overlying a core back to the shroud. The plurality of struts may act as a heat sink, which may provide increased cooling of the stator core and/or windings in use. The plurality of struts may each overlie a respective winding. A leading end of each strut may be substantially aligned with a leading edge of a winding which the strut overlies. This may ensure that the heat sink provided by the strut is located in substantially the same position as the heat source, ie the windings. The leading end of each strut may comprise an aerodynamically shaped surface. Each strut may be located between the first and second turbulators of a pair of turbulators.

In some examples each turbulator may comprise a generally v-shaped turbulator. The frame may comprise a plurality of generally v-shaped turbulators located either side of the struts.

The frame may comprise a plurality of apertures for introducing airflow to the rotor assembly, for example into the channel, in use. This may provide a cooling airflow to the rotor assembly, for example to the permanent magnet of the rotor assembly, through the channel, in use. The plurality of apertures may comprise pairs of respective inlet and outlet apertures, inlet apertures located at an inlet end of the frame, and outlet apertures located at an outlet end of the frame. Inlet apertures may be located downstream of the first bearing, and outlet apertures may be located upstream of the second bearing.

According to a second aspect of the present invention there is provided a vacuum cleaner comprising a brushless motor according to the first aspect of the present invention.

According to a third aspect of the present invention there is provided a method of manufacturing a brushless motor, the method comprising: obtaining a plurality of stator core sub-assemblies, each comprising a stator core, a bobbin attached to the stator core, and a winding wound about the bobbin, each bobbin comprising a connection portion for connecting to an adjacent bobbin in the stator assembly; connecting adjacent stator core sub-assemblies, via the connection portions of the bobbin, to form a stator assembly; and overmoulding the stator assembly to define a frame within which the stator assembly is housed.

The method according to the third aspect of the present invention may be advantageous as the connection portions of the bobbins may aid with alignment of the stator core sub-assemblies during overmoulding of the frame to the stator assembly in manufacture.

Overmoulding the frame to the stator assembly may, for example, remove the need for the stator core sub-assemblies to be individually adhered to the frame, and may provide a manufacturing process with fewer steps than a manufacturing process in which the stator core sub-assemblies are individually adhered to the frame. Overmoulding the frame to the stator assembly may, in some examples, provide increased thermal transfer from the stator core sub-assemblies to the frame compared to embodiments where stator core sub-assemblies are adhered to the frame.

Overmoulding the frame to the stator assembly may provide a brushless motor having a greater overall stiffness than, for example, a brushless motor in which the stator core sub-assemblies are individually adhered to the frame. Overmoulding the frame to the stator assembly may also facilitate manufacture of a brushless motor having a generally sealed bearing cartridge compared to, for example, an arrangement where the frame has apertures into which individual stator core sub-assemblies are mounted. A sealed bearing cartridge may inhibit airflow from entering the region of the frame in which the bearings are housed in use, which may reduce emissions.

The method may comprise inserting a rotor assembly into a channel defined by the frame such that the rotor assembly is rotatable relative to the stator assembly.

Each bobbin may be overmoulded to a respective stator core in a respective first overmoulding process, and the frame may be overmoulded to the stator assembly in a second overmoulding process different to the first overmoulding process. This may enable creation of the individual stator sub-assemblies before subsequent overmoulding of the frame to the stator assembly.

The method may comprise overmoulding a sleeve to first and second terminals, and attaching the windings to the terminals to form the stator assembly. Overmoulding the sleeve to the first and second terminals may provide support to the terminals during attachment, for example fusing, of the windings to the terminals, and may support the first and second terminals during overmoulding of the frame to the stator assembly, thereby providing more consistent wall thicknesses between brushless motors manufactured on the same assembly line. Overmoulding the frame to the stator assembly, which includes the windings and the first and second terminals, may provide support to the windings and fused joints in the manufactures brushless motor, which may result in reduced failures in use due to fatigue and/or vibration. Overmoulding the frame to the stator assembly, which includes the windings and the first and second terminals, may ensure that the assembly is insulated between the first and second terminals for the purposes of creepage and clearance.

The sleeve may comprise a same material as the frame, and the sleeve and the frame may be formed in separate overmoulding processes. This may allow for creation of the stator assembly prior to overmoulding the frame to the stator assembly, which may enable control of alignment of the stator core sub-assemblies during manufacture.

Optional features of aspects of the present invention may be equally applied to other aspects of the present invention, where appropriate.

DETAILED DESCRIPTION OF THE INVENTION

Figure 1:
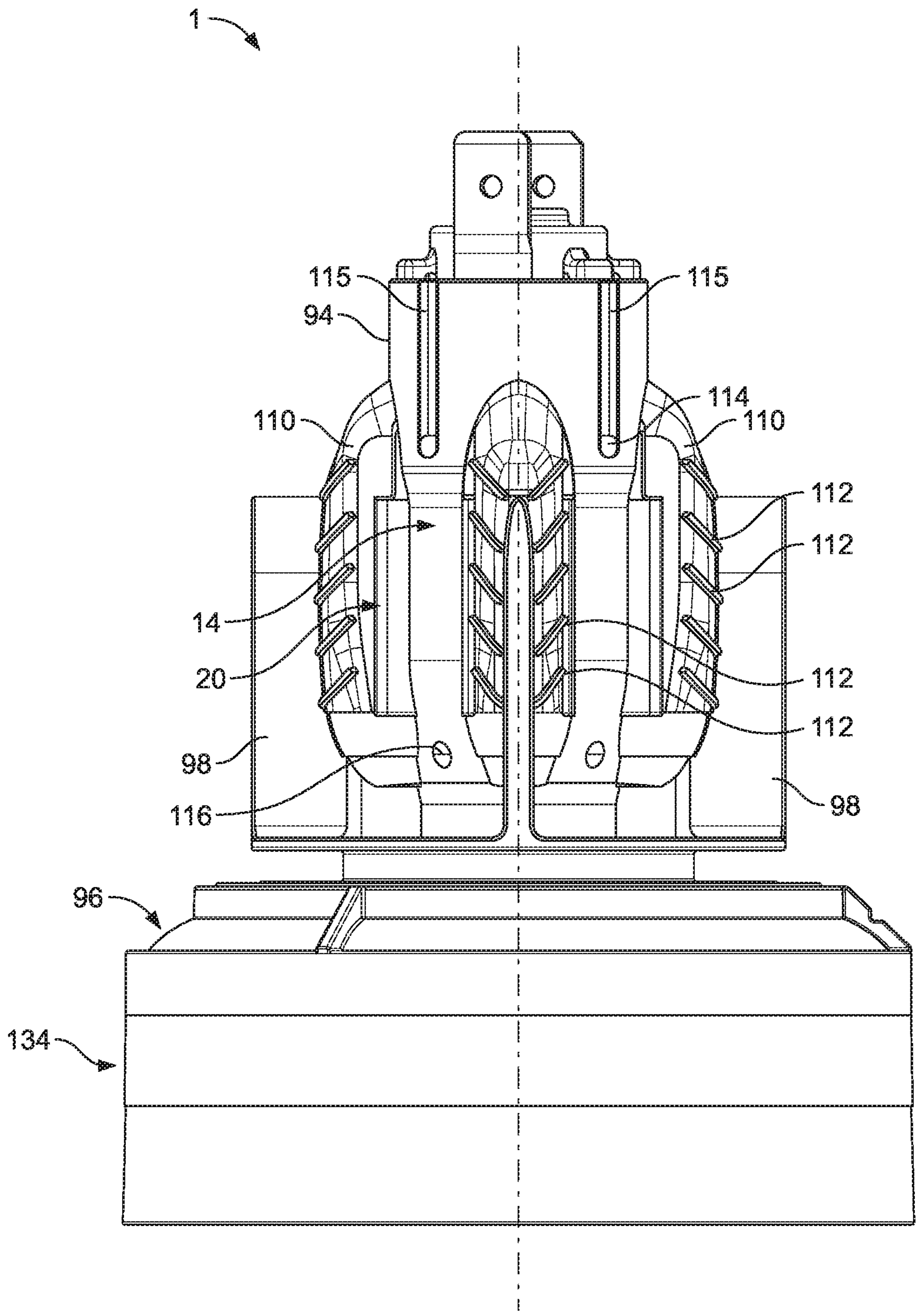
FIG. 1 is a perspective view of a brushless permanent magnet motor.

A brushless permanent magnet motor according to the present invention, generally designated 1, is illustrated in FIG. 1, with components of the brushless permanent magnet motor illustrated in FIGS. 2 to 7. Although described here in relation to a brushless permanent magnet motor, it will be appreciated by a person skilled in the art that at least some of the teachings disclosed herein may be applicable to other types of brushless motor.

The brushless permanent magnet motor comprises a stator assembly 10, a rotor assembly 12, and a frame 14.

Figure 2:
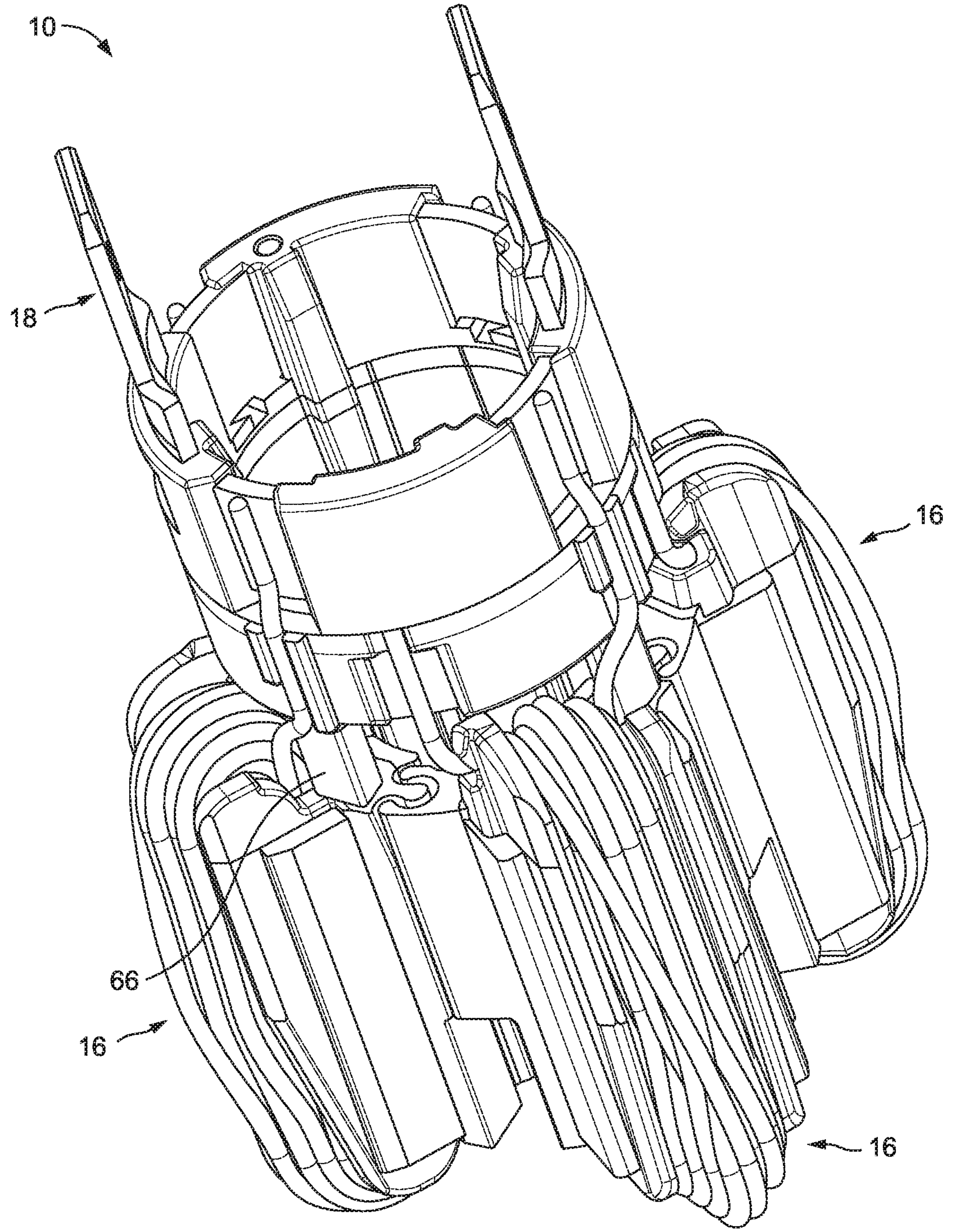
FIG. 2 is a perspective view of a stator assembly of the brushless permanent magnet motor of FIG. 1.
Figure 3:
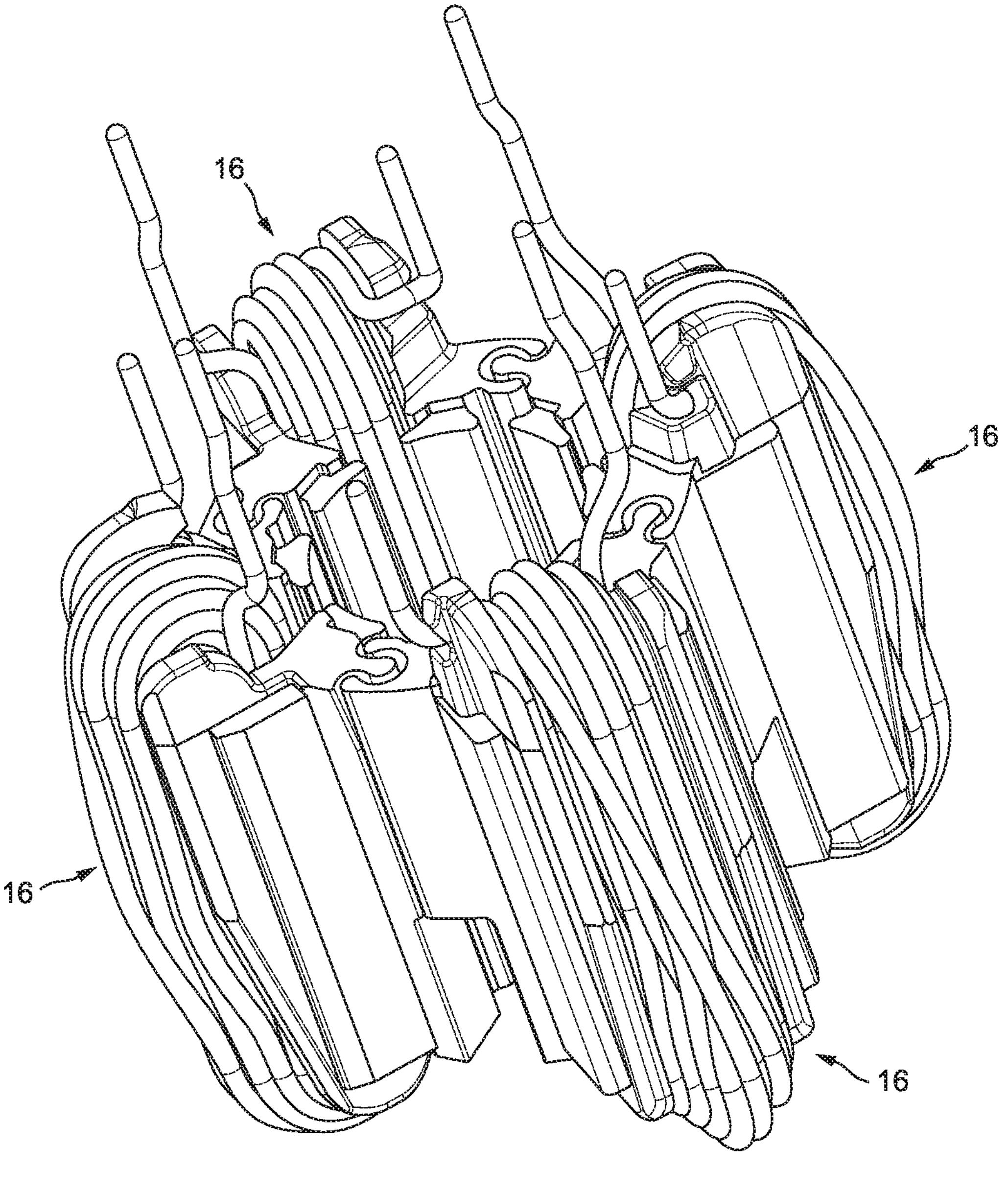
FIG. 3 is a perspective view of a plurality of stator core sub-assemblies of the stator assembly of FIG. 2.
Figure 4:
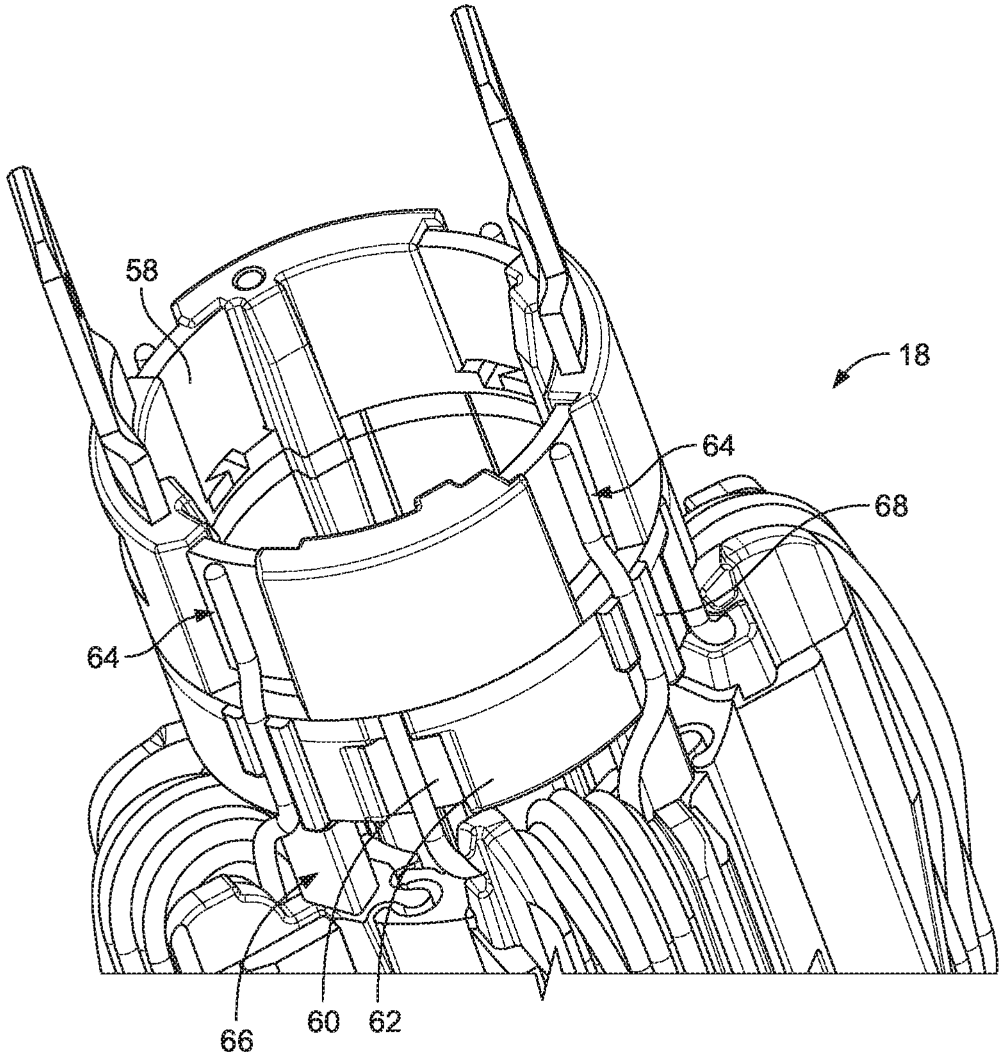
FIG. 4 is a perspective view of a termination assembly of the stator assembly of FIG. 2.
Figure 5:
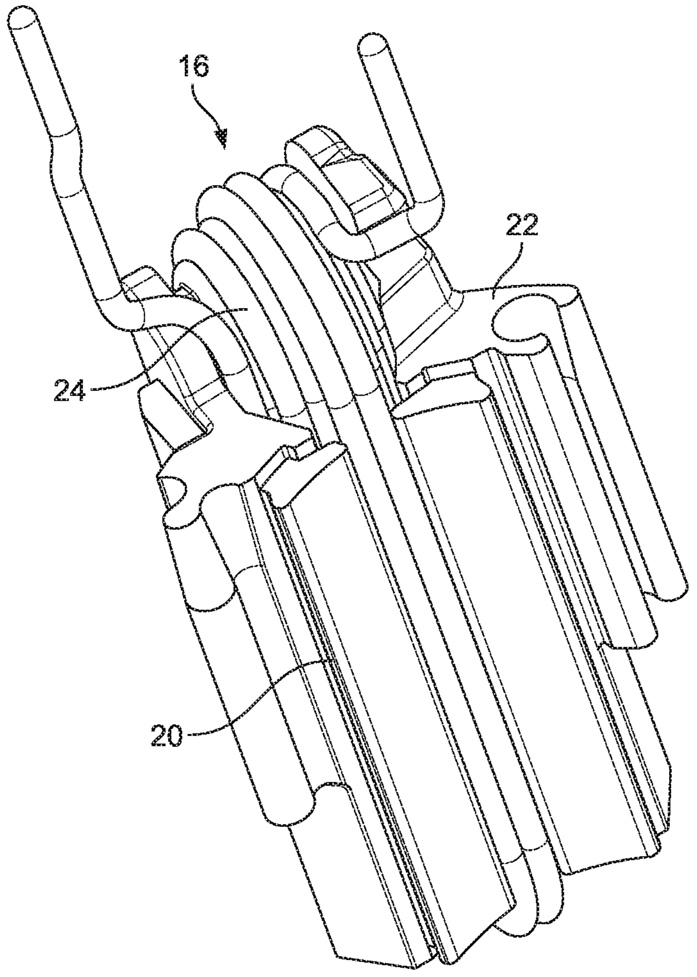
FIG. 5 is a perspective view of a single stator core sub-assembly of the stator assembly of FIG. 2.

The stator assembly 10 is illustrated in isolation in FIG. 2, and comprises four stator core sub-assemblies 16 and a termination assembly 18. The four stator core sub-assemblies are shown connected in FIG. 3, with the termination assembly 18 shown in isolation in FIG. 4. An individual stator core sub-assembly 16 can be seen in FIGS. 5 and 6, and it will be appreciated that each stator core sub-assembly 16 has substantially the same structure.

The stator core sub-assembly 16 comprises a stator core 20, a bobbin 22, and a winding 24 wound about the bobbin 22. The stator core 20 has a back 26, and first 28 and second 30 arms extending from the back 26. The stator core 20 has a generally C-shaped form, and may be referred to as a c-core. The first 28 and second 30 arms each comprise a respective first portion 32,34 and a respective second portion 36,38. Each first portion 32,34 extends substantially orthogonally from the back 26, and each second portion 36,38 is angled at around 28 degrees relative to the respective first portion 32,34. Each second portion 36,38 is around 2 times the length of the respective first portion 32,34.

Figure 6:
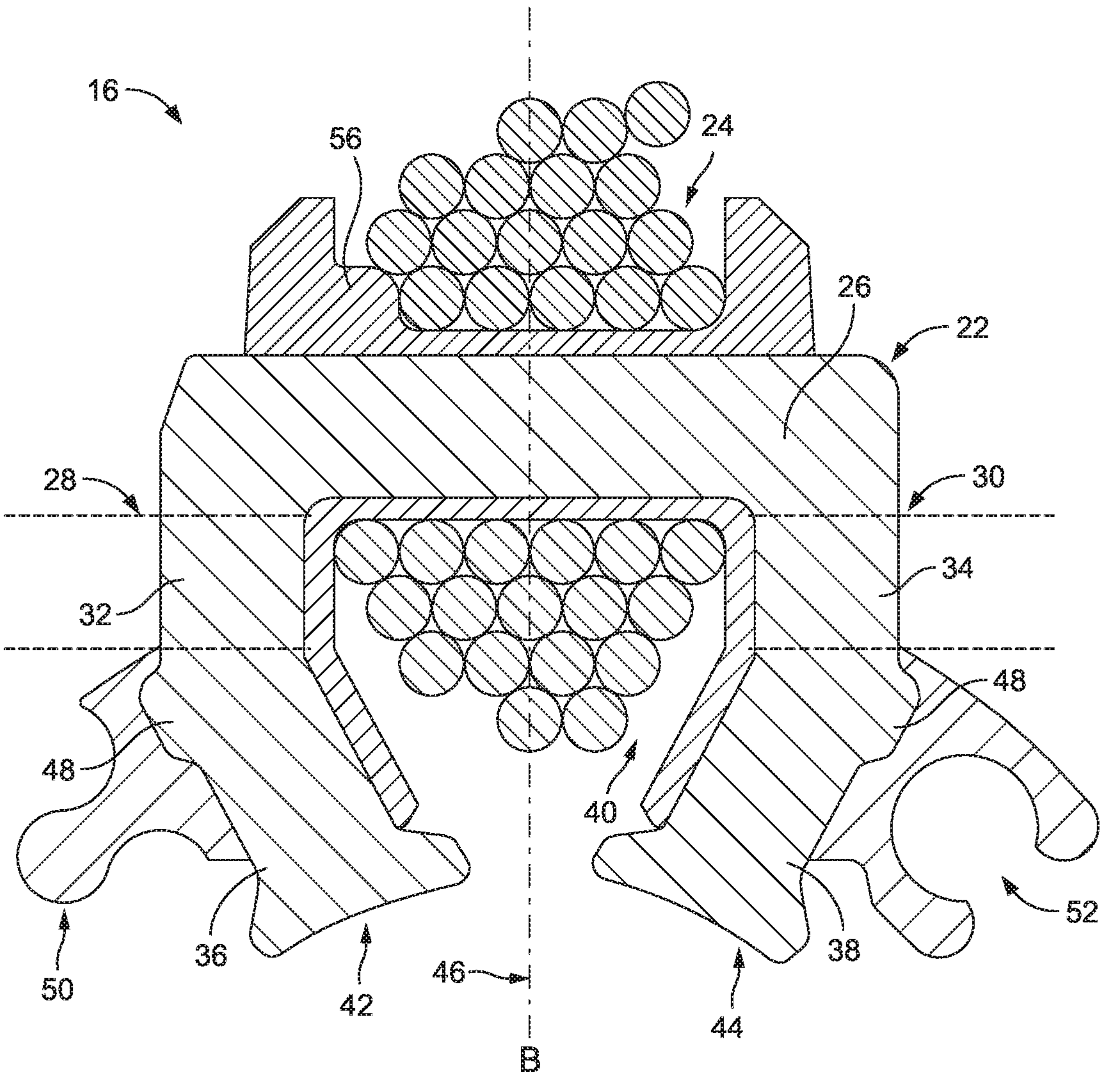
FIG. 6 is a cross-sectional view through the stator core sub-assembly of FIG. 5.

The second portions 36,38 are angled inwardly toward one another, and collectively the back 26 and the first 28 and second 30 arms define a winding channel 40 within which the winding 24 is located. Given the relative orientations of the back 26 and the first 28 and second 30 arms, the winding channel 40 has a generally trapezoidal cross-sectional area, as seen in FIG. 6. It has been found that provision of a generally trapezoidal winding channel 40 may enable a winding pattern of the winding 24 that achieves a relatively high fill factor, whilst angling the second portions 36,38 of the first 28 and second 30 arms inwardly toward one another may reduce a height of the stator core 20.

The stator core 20 comprises pole faces 42,44 disposed at ends of the respective second portions 36,38, with the pole faces 42,44 extending to either side of the respective second portions 36,38. The pole faces 42,44 are spaced apart from one another to define a slot gap 46, with the slot gap 46 defining a point of entry into the winding channel 40. The pole faces 42,44 are asymmetric to provide saliency, and are curved with each pole face 42,44 having a different center of curvature. The asymmetry of the pole faces 42,44 results in different distances from each pole face 42,44 to a centre line B of the slot gap 46. Each pole face 42,44 is asymmetric relative to the other pole face 44,42, but each individual pole face 42,44 is also asymmetric about a center line of that pole face.

To maximise flux linkage between the stator core 20 and the rotor assembly 12 in use, it may be desirable for the pole faces 42,44 to be as wide as possible. However, increasing the width of the pole faces 42,44 in an inward direction may reduce a width of the slot gap 46, making winding of the stator core 20 difficult. Increasing the width of the pole faces 42,44 in an outward direction may increase flux leakage between adjacent stator cores 20 in the stator assembly 10. To provide a compromise between these competing factors, a ratio of the combined width of the pole faces 42,44 to the width of the slot gap 46 is in the region of 3:1 to 7:1.

The stator core 20 is formed of a plurality of laminations, each having the form previously described. A protrusion 48 is located on an outer surface of each second portion 36,38, with the protrusions 48 being used to weld the laminations together to form the stator core 20. In other examples, the laminations are glued together rather than welded. The protrusions 48 may be located out of a main flux loop of the stator assembly 10 in use, which may minimise stator iron loss. The protrusions 48 are located at a same distance along each respective second portion 36,38, which may minimise induced voltage potential between the two points so as to minimise losses. The back 26 is asymmetric about the centre line B of the slot gap, which enables correct orientation of the stator core 20 during manufacture.

The bobbin 22 is overmoulded to the stator core 20, such that the bobbin 22 overlies inner and outer surfaces of the back 26, inner surfaces of the first portions 32,34 of the first 28 and second 30 arms, and inner and outer surfaces of the second portions 36,28 of the first 28 and second 30 arms. The bobbin 22 thereby lines the winding channel 40, and allows the winding 24 to be wound about the back 26 of the stator core 20. Overmoulding the bobbin 22 to the stator core 20 enables the bobbin to have a wall thickness in the region of 0.4 mm in the winding channel 40, which may maximise the available cross-sectional area to be filled with the winding 24.

The bobbin 22 is overmoulded to the stator core 20 such that shoulders of the stator core 20, ie portions of the stator core the bridge the back 26 and the first portions 32,34 of the first 28 and second 30 arms, are exposed, and such that the pole faces 42,44 are exposed, for reasons that will be discussed hereafter.

A region of the bobbin 22 on an outer surface of the second portion 36 of the first arm 28 defines a first connection portion 50, and a region of the bobbin 22 on an outer surface of the second portion 38 of the second arm 30 defines a second connection portion 52. The first connection portion 50 comprises a rounded projection that extends partially along the length of the bobbin 22, and the second connection portion 52 comprises a rounded recess that extends partially along the length of the bobbin 22. The first 50 and second 52 connection portions are complementarily shaped, such that adjacent bobbins 22 in the stator assembly 10 can be connected to one another by axially sliding the relevant connection portions 50,52 together. The connection portions 50,52 allows relative axial movement of connected bobbins 22, whilst inhibiting circumferential and radial separation of the bobbins 22. The connection portions 50,52 enable individual stator core sub-assemblies 16 to be connected together during manufacture, as will be described hereinafter.

As seen in the cross-sectional view of FIG. 6, the bobbin 22 comprises a winding guide 56 located in a region of an outer surface of the back 26. The winding guide 56 serves to guide the winding 24 during winding of the stator core 22.

When wound, as seen in the cross-sectional view of FIG. 6, the winding 24 has a generally trapezoidal form within the winding channel 40. This may provide a relatively high fill factor. The winding 24 is asymmetric about the back 26, with the portion of the winding 24 that overlies an outer surface of the back 26 defining a different cross-sectional shape to the portion of the winding 24 located within the winding channel 40. This may enable a relatively high fill factor within the winding channel 24, whilst still providing flexibility for connection to terminals of the termination assembly 18.

The termination assembly 18 comprises a first, upper, terminal 58, a second, lower, terminal 60, and a sleeve 62. Each of the first 58 and second 60 terminals is generally annular in form, with the first terminal 58 overlying the second terminal 60. The sleeve 62 is overmoulded to the first 58 and second 60 terminals such that the relative positions of the first 58 and second 60 terminals are maintained. The sleeve 62 comprises a plurality of apertures 64 which enable the windings 24 of the stator core sub-assemblies 16 to be connected to the first 58 and second 60 terminals. The sleeve 62 further comprises a plurality of locating features 66 for locating the sleeve 62 relative to the bobbins 22 during manufacture, and wire guides 68 formed on the locating features 66. The locating features 66 are each located adjacent to a corresponding aperture 64.

Figure 7:
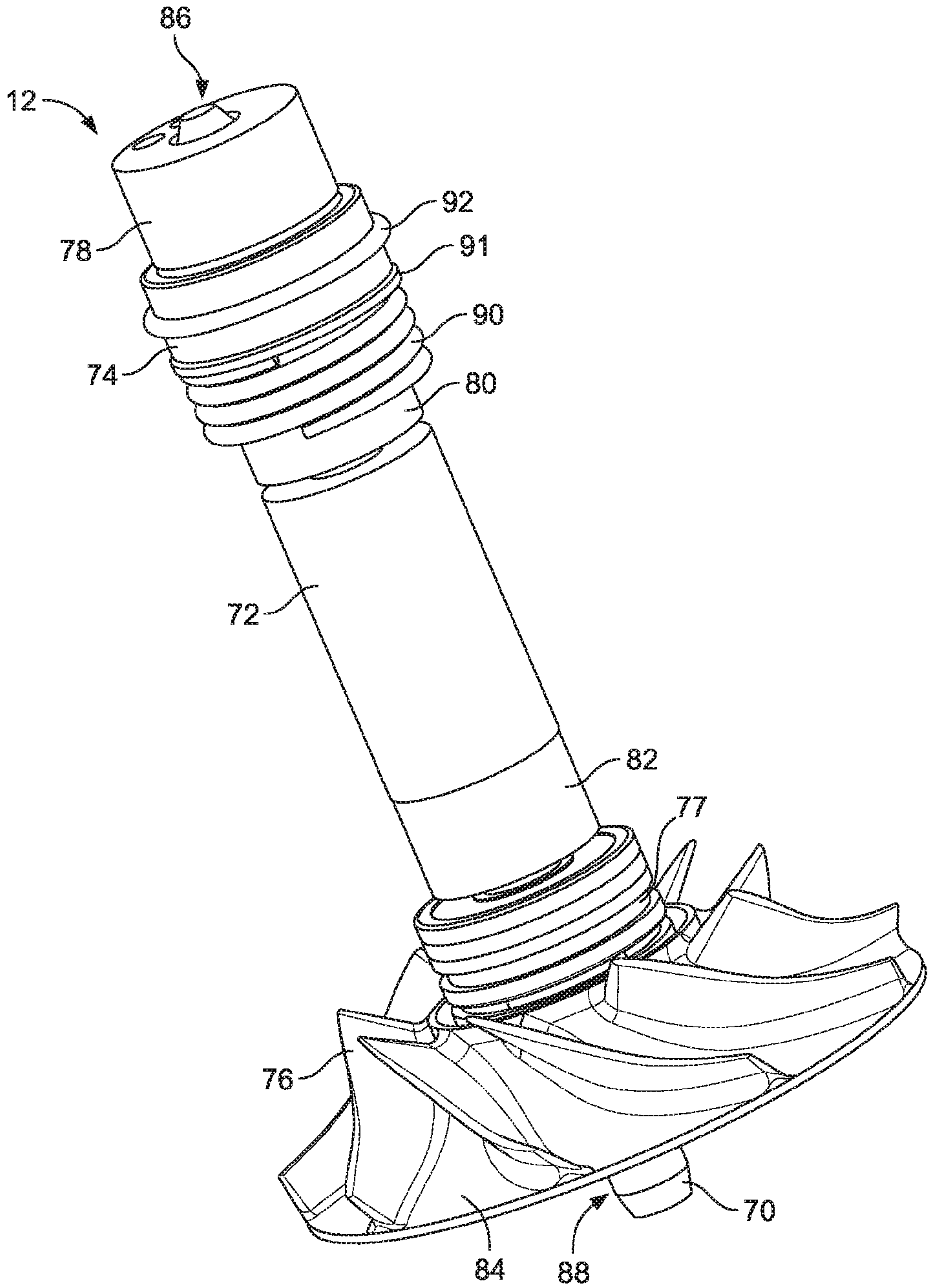
FIG. 7 is a perspective view of a rotor assembly of the brushless permanent magnet motor of FIG. 1.

The rotor assembly 12 is shown in isolation in FIG. 7. The rotor assembly 12 comprises a shaft 70, a permanent magnet 72, first 74 and second 76 bearings, first 78, second 80 and third 82 balancing rings, and an impeller 84.

The shaft 70 is elongate in form, having an inlet end 86 and an outlet end 88, with inlet and outlet referring generally to a direction of airflow through the brushless permanent magnet motor 1 in use. The permanent magnet 72 is mounted generally centrally along the shaft 70. The first balancing ring 78 is mounted to the shaft 70 at the inlet end 86, with the first bearing 74 mounted to the shaft 70 adjacent to the first balancing ring 78. The second balancing ring 80 is mounted to the shaft 70 between the first bearing 74 and the permanent magnet 72.

The impeller 84 is mounted to the outlet end 88 of the shaft 70. The second bearing 76 is mounted to the shaft 70 adjacent to the impeller 84, with the third balancing ring 82 mounted to the shaft 70 between the second bearing 76 and the permanent magnet 72. The second bearing 76 comprises annular grooves 77 for receiving adhesive.

The rotor assembly 12 further comprises a pre-load spring 90 for applying a pre-load to the first bearing 74, an annular washer 91 in contact with the pre-load spring 90 and the outer race of the first bearing 74, and an o-ring 92 located about the first bearing 74, as will be discussed in more detail hereinafter.

Figure 8:
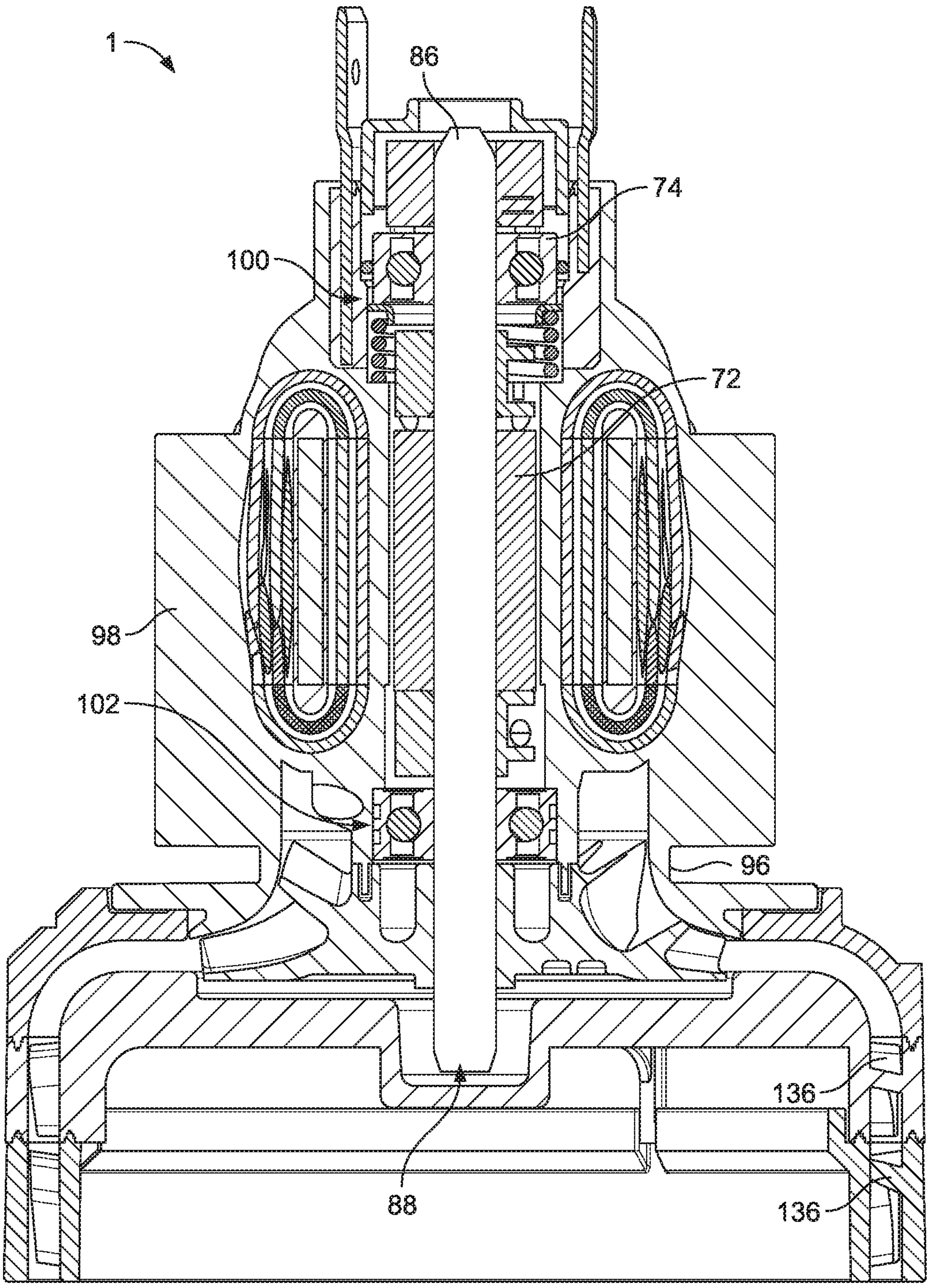
FIG. 8 is a cross-sectional view through the brushless permanent magnet motor of FIG. 1.
Figure 9:
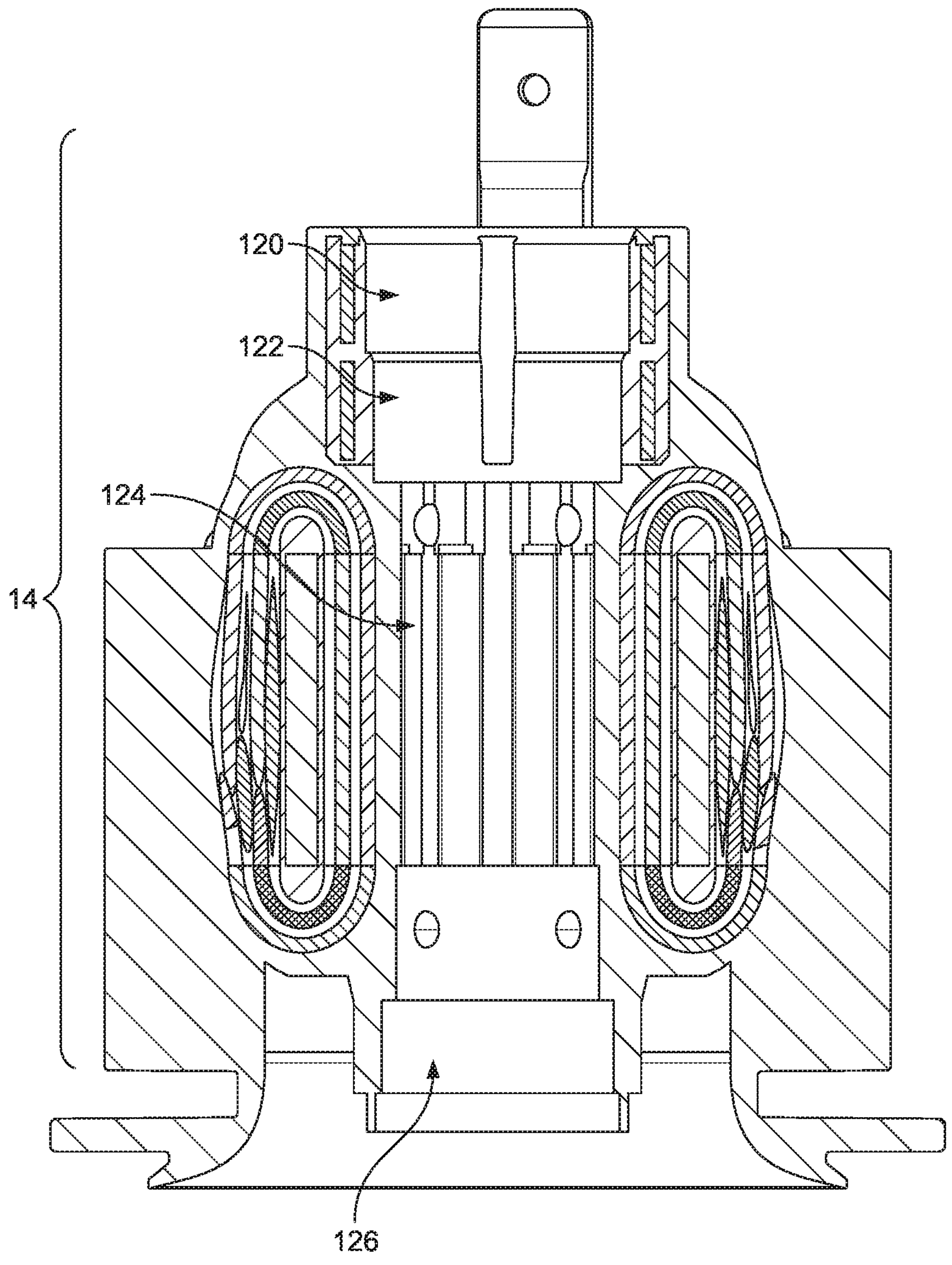
FIG. 9 is a cross-sectional view through the brushless permanent magnet motor of FIG. 1 with the rotor assembly and diffuser removed.

The frame 14 can be seen in FIGS. 1, 8 and 9, and comprises a main body 94, a shroud 96, and a plurality of struts 98 extending between the main body 94 and the shroud 96. The main body 94 is generally cylindrical in form, defines first 100 and second 102 bearing seats for the respective first 74 and second 76 bearings, and defines a channel 104 within which the rotor assembly 12 is received. The shroud 96 is radially spaced from the main body 94, and has a central aperture that overlies the impeller 84, such that airflow can interact with the impeller 84 in use.

To manufacture the frame 14, the frame 14 is overmoulded to the stator assembly 10 in an overmoulding process. Given the form of the wound stator core sub-assemblies 16, the overmoulding of the frame 14 results in the main body 94 of the frame 14 having protrusions 110 which overlie the windings 24 located on the backs 26 of the stator cores 22. The protrusions 110 are formed such that the shoulders of the stator cores 22 are not covered by the frame 14. This allows the shoulders of the stator cores 22 to be exposed to airflow through the brushless permanent magnet motor 1 in use, which may provide a cooling effect for the stator cores 22. The frame 14 is also overmoulded such that the pole faces 42,44 of the stator cores 22 are exposed to the interior of the channel. Collectively, at least 10% but no more than 30 of each stator core is not covered by the frame 14.

The protrusions 110 define regions of increased radius relative to the regions of the main body 94 that lie between adjacent stator core sub-assemblies. This reduces a volume of material required for the frame 14 compared to a frame that has a constant radius, and may provide improved heat transfer may removing unnecessary frame material.

To aid with heat transfer away from the rotor assembly 12 and the stator assembly 10 in use, the frame 14 is formed from a material having a through-plane thermal conductivity, of at least 1.5 W/mK. To provide strength to the brushless permanent magnet motor 1, the frame comprises a Young's modulus in the region of 10-45 GPa, for example in the region of 25 GPa.

To further aid with heat transfer away from the windings 24, the frame 14 comprises a plurality of turbulators 112 formed on the protrusions 110. Each turbulator 112 is a projection upstanding from a protrusion 110, with the turbulators 112 formed as part of the same overmoulding process that defines the rest of the frame 14. It will be appreciated that in alternative embodiments the turbulators 112 may be formed as separate components to the remainder of the frame 14, and attached to the frame 14 in any appropriate manner, such as via an adhesive or the like.

The turbulators 112 are arranged in pairs along the length of each protrusion 110. Each turbulator 112 is angled at around 60 degrees relative to an axis parallel to a central longitudinal axis of the brushless permanent magnet motor 1, ie an axis parallel to the shaft 70. Collectively a pair of turbulators 112 defines a general chevron-like shape, with the chevron-like shape pointing toward the impeller 84. In alternative embodiments, not illustrated here, each turbulator 112 may itself comprise a chevron-shape.

There may be a compromise to be reached in terms of allowing the turbulators 112 to generate vortices in the region of the protrusions 110 to aid with transfer of heat away from the windings 24 of the stator assembly 10 in use, versus avoiding choking airflow through the brushless permanent magnet motor 1 in use. A pitch to height ratio of each turbulator in the region of 10:1 has been found to be an effective compromise, with a height of each turbulator in the region of 0.6 mm, for example around 0.58 mm.

The form of turbulator 112 described above may be effective at generating vortices in the region of the protrusions 110, which overlie the windings 24 on the backs 26 of the stator cores 22, with such vortices aiding with transfer of heat away from the windings 24 of the stator assembly 10 in use.

The struts 98 extend from the protrusions to the shroud 96, such that the struts 98 also overlie the windings 24 on the backs 26 of the stator cores 22. The struts 98 may thereby act as heat sinks for the windings 24, with airflow moving over the struts 98 in use to carry heat away from the struts 98. A leading end of each strut 98 is substantially aligned with a leading edge of a winding 24 that the strut overlies to ensure that the strut 98 is aligned with the appropriate heat source, ie winding 24. The leading end of each strut is aerodynamically shaped, in a curved manner, to promote desirable airflow characteristics through the brushless permanent magnet motor 1 in use.

The main body 94 of the frame 14 comprises a plurality of inlet cooling apertures 114, a plurality of outlet cooling apertures 116, and an adhesive injection aperture (not shown). The plurality of inlet cooling apertures 114 are located in a region below the first bearing seat 100, and are spaced about the periphery of the main body 94. The plurality of inlet cooling apertures 114 are shaped to direct airflow flowing through the brushless permanent magnet motor 1 in use into the channel 104, which provides a cooling effect for the rotor assembly 12. The main body 94 of the frame 14 further comprises a plurality of inlet guide grooves or channels 115 formed in the outer surfaces of the main body 94, with each of these inlet guide grooves 115 being arranged to guide airflow flowing through the brushless permanent magnet motor 1 in use into a respective inlet cooling aperture 114. Each of the plurality of inlet guide grooves 115 extend axially, in a direction parallel to a central longitudinal axis of the brushless permanent magnet motor 1, from the upstream end of the main body 94 of the frame 14 to the respective inlet cooling apertures 114.

The plurality of outlet cooling apertures 116 are located in a region of the second bearing seat 102, and are spaced about the periphery of the main body 94. The plurality of outlet cooling apertures 116 are shaped to direct airflow flowing through the channel 104, outwardly from the frame 14, before the airflow passes through the impeller 84. The adhesive injection aperture allows insertion of adhesive into the annular grooves 77 of the second bearing 76 through the frame 14.

An outlet end of the main body 94 of the frame defines a labyrinth seal with the impeller 84.

A cross-section through the brushless permanent magnet motor 1 is shown in FIGS. 8 and 9. As can be seen, the rotor assembly 12 sits within the frame 14, with the first bearing 74 located at the first bearing seat 100, the second bearing 76 located at the second bearing seat 102, and the permanent magnet 72 aligned with the stator cores 22 of the stator assembly 10. The second bearing 76 is secured to the second bearing seat 102 by adhesive located in the annular grooves 77 formed on the outer race of the second bearing 76.

The channel 104 of the frame comprises first 120 and second 122 portions of different diameters in the region of the first bearing 74, with the first 120 and second 122 portions collectively defining the first bearing seat 100.

The o-ring 92 is located substantially centrally along the axial length of the first bearing 74. The o-ring 92 sits between the first bearing 74 and the frame 14 in the first portion 120 of the channel 104 such that the o-ring 92 is substantially uncompressed, and has a substantially circular cross-sectional profile. The o-ring has a shore A hardness of around 75, and has a radial stiffness in the region of $1.0\times10^6$ N/m to $4.0\times10^6$ N/m, for example around $2.5\times10^6$ N/m. Providing the o-ring 92 with a relatively high radial stiffness may in turn provide the rotor assembly 12 with a relatively high radial stiffness. This allows the rotor assembly 12 to operate as a sub-critical rotor assembly, and allows the brushless permanent magnet motor 1 to operate in a speed range below all resonant frequencies of the rotor assembly 12. The o-ring 92 has a thermal conductivity of at least 3 W/mK, which may aid with heat transfer away from the first bearing 74 in use.

The low compression of the o-ring 92 between the first bearing 74 and the frame 14 in the first portion 120 of the channel 104, along with the substantially circular cross-sectional profile of the o-ring 92, enables the o-ring 92 to roll axially, in a direction parallel to a central longitudinal axis of the brushless permanent magnet motor 1. This may facilitate pre-loading of the first bearing 74 by the pre-load spring 90 via the annular washer 91. A step change between the first 120 and second 122 portions of the channel 104 defines an axial stop for inhibiting motion of the o-ring 92 toward the impeller 84.

A third portion 124 of the channel 104 has a reduced diameter relative to the first 120 and second 122 portions of the channel 104, with the permanent magnet 72 sitting within the third portion 124 of the channel 104. A step change between the second 122 and third 124 portions of the channel 104 defines a seat for the pre-load spring 90. A fourth portion 126 of the channel 104 has an increased diameter relative to the third portion of the channel 104, with the fourth portion 126 of the channel 104 defining the second bearing seat 102.

Whilst the o-ring 92 is relatively stiff, the o-ring 92 is still deformable in the event that the brushless permanent magnet motor 1 experiences forces during abnormal use, for example as a result of the brushless permanent magnet motor 1 or a product in which the motor is installed being dropped. A distance between the first bearing 74 and a wall of the channel 104 in the first portion 120 is greater than a distance between the first bearing 74 and a wall of the channel 104 in the second portion 122. Similarly, the distance between the first bearing 74 and a wall of the channel 104 in the second portion 122 is greater than a distance between the permanent magnet 72 and a wall of the channel 104 in the third portion 124, and greater than a distance between the permanent magnet 72 and the pole faces 42,44 in the third portion 124. As a result, when the o-ring 92 is compressed during abnormal use, there is a risk that the permanent magnet 72 will contact the pole faces 42,44 or the wall of the channel 104 in the third portion 124, which can cause damage to the permanent magnet 72.

Figure 10:
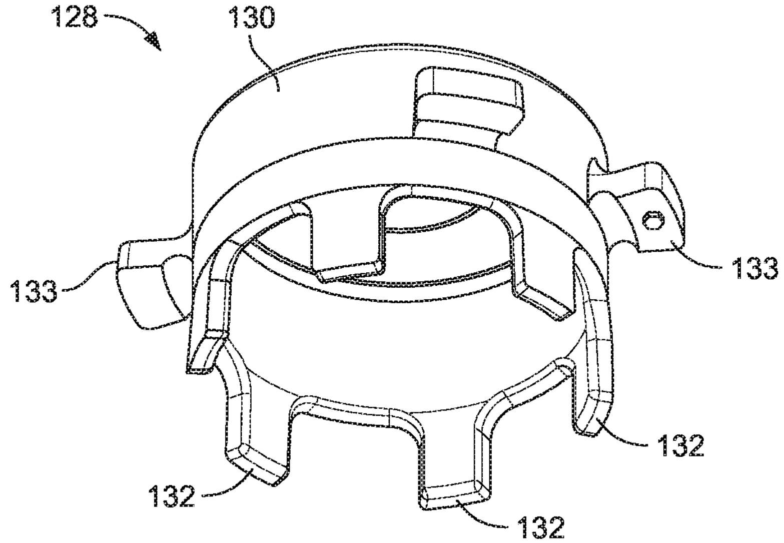
FIG. 10 is a perspective view of an end cap of the brushless permanent magnet motor of FIG. 1.

To avoid this happening, the brushless permanent magnet motor 1 has an end cap 128, which is shown in isolation in FIG. 10.

The end cap 128 comprises a main body 130, a plurality of fingers 132 extending from the main body 130, and a plurality of flanges 133 extending from the main body 128. The main body 130 is generally cylindrical in form, and hollow. The main body 130 overlies the inlet end 86 of the shaft 70 and the first balancing ring 78 when the brushless permanent magnet motor 1 is assembled. The plurality of fingers 132 are resiliently deformable, and, when not mounted to the brushless permanent magnet motor 1, the plurality of fingers 132 splay slightly outwardly from the main body 128. The plurality of fingers 132 extend from the main body 128 in a first direction, and the plurality of flanges 133 extend from the main body 128 in a second direction substantially orthogonal to the first direction. The plurality of flanges 133 engage the main body 94 of the frame 14 to prevent over-insertion of the end cap 128 into the frame 14.

Figure 11:
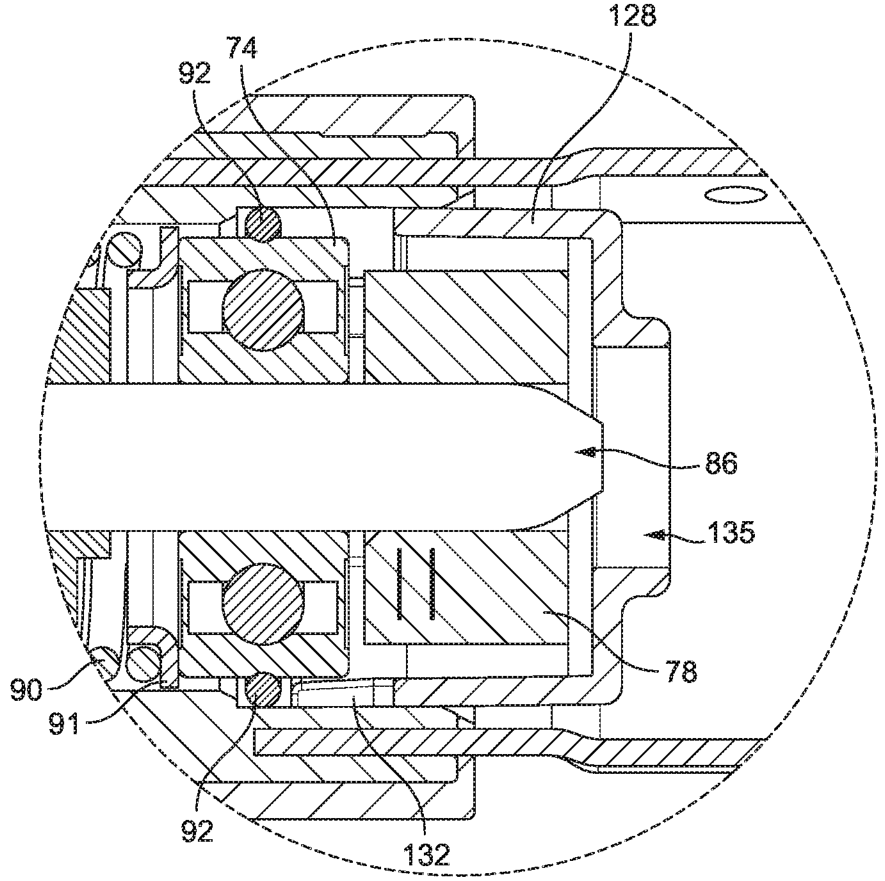
FIG. 11 is an enlarged cross-sectional view of an inlet end of the brushless permanent magnet motor of FIG. 1.

An enlarged view of the end cap 128 located at the inlet end 86 of the shaft 70 is shown in FIG. 11.

The end cap 128 is located in the first portion 120 of the channel 104 such that the fingers 132 contact the wall of the first portion 120 of the channel 104 to retain the end cap 128 within the first portion 120. The plurality of fingers 132 are located between the first bearing 74 and the wall of the first portion 120 of the channel 104, with the plurality of fingers 132 spaced from the first bearing 74. A distance between the first bearing 74 and the plurality of fingers 132 is less than the distance between the permanent magnet 72 and a wall of the channel 104 in the third portion 124, and less than the distance between the permanent magnet 72 and the pole faces 42,44 in the third portion 124.

Thus in the event that the o-ring 92 is deformed when the brushless permanent magnet motor 1 experiences forces during abnormal use, the first bearing 74 contacts at least some of the plurality of fingers 132 before the permanent magnet 72 is able to contact the pole faces 42,44 or the wall of the channel 104 in the third portion 124. Thus the plurality of fingers 132 may act as a stopper to inhibit radial motion of the first bearing 74.

As depicted here, the end cap 128 comprises an aperture 135 through which the shaft 70 extends. In alternative embodiments, the end cap 128 may not comprise the aperture 135, which may facilitate creation of a sealed bearing cartridge. Similarly, the plurality of inlet cooling apertures 114 and the plurality of outlet cooling apertures 116 may be omitted where a sealed bearing cartridge is desirable. A sealed bearing cartridge may inhibit airflow from entering the region of the frame 14 in which the bearings 74,76 are housed in use, which may reduce emissions.

The brushless permanent magnet motor 1 further comprises a diffuser 134 located downstream of the impeller 84. The diffuser 134 is attached to the shroud 96 and comprises a plurality of vanes 136 for turning airflow as it passes through the diffuser 134 from the impeller 84 in use. Although depicted as a multi-stage diffuser, ie a diffuser with more than one row of vanes, it will be appreciated that other forms of diffuser, such as a single stage diffuser, are also envisaged.

In use, current is passed through the windings 24 of the stator assembly 10 to generate a magnetic field that interacts with the permanent magnet 72 to cause rotation of the rotor assembly 12, and hence rotation of the impeller 84. This causes air to be drawn into the brushless permanent magnet motor 1, where air interacts with the impeller 84 before exiting the brushless permanent magnet motor 1 via the diffuser 134.

Steps involved in manufacture of the brushless permanent magnet motor 1 will now be reiterated.

Each stator core sub-assembly 16 is assembled individually, with the bobbin 22 overmoulded to the stator core 20, and the winding 24 wound about the bobbin 22. Individual stator core sub-assemblies 16 are connected to one another via the first 50 and second 52 connection portions of the respective bobbins 22.

The sleeve 62 is overmoulded to the first 58 and second 60 terminals to define the termination assembly 18, and the windings 24 are fused to the first 58 and second 60 terminals. Collectively, the stator core sub-assemblies 16 and the termination assembly 18 define the stator assembly 10. The sleeve 62 and the bobbins 22 are formed from different materials, and are overmoulded to their respective components in separate overmoulding processes.

The frame 14 is overmoulded to the stator assembly 10 in a separate overmoulding process to each of those of the bobbins 22 and the sleeve 62, and the frame 14 is formed from the same material as the sleeve 62.

The rotor assembly 12 is inserted into the frame 14, and the end cap 128 is located over the inlet end 86 of the shaft 70.

Figure 12:
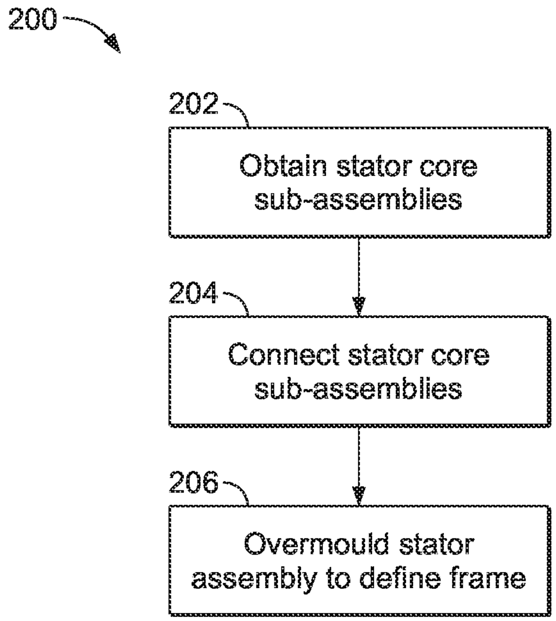
FIG. 12 is a flow diagram illustrating a first method of manufacturing a brushless permanent magnet motor.

A first method 200 of manufacturing the brushless permanent magnet motor 1 is illustrated in the flow diagram of FIG. 12.

The method 200 comprises obtaining 202 the plurality of stator core sub-assemblies 16, connecting 204 adjacent stator core sub-assemblies 16 to form the stator assembly 10, and overmoulding 206 the stator assembly 10 to define the frame 14 within which the stator assembly 10 is housed.

By overmoulding the stator assembly 10 to define the frame 14, the need for the stator core sub-assemblies 16 to be individually adhered to the frame 14 may be removed, and this may provide a manufacturing process with fewer steps than a manufacturing process in which the stator core sub-assemblies 16 are individually adhered to the frame 14. Overmoulding the frame 14 to the stator assembly 10 may, in some examples, provide increased thermal transfer from the stator core sub-assemblies 16 to the frame 14 compared to embodiments where stator core sub-assemblies 16 are adhered to the frame 14.

Overmoulding the frame 14 to the stator assembly 10 may provide a brushless permanent magnet motor 1 having a greater overall stiffness than, for example, a brushless permanent magnet motor in which the stator core sub-assemblies are individually adhered to the frame. Overmoulding the frame 14 to the stator assembly 10 may also facilitate manufacture of a brushless motor having a generally sealed bearing cartridge compared to, for example, an arrangement where the frame has apertures into which individual stator core sub-assemblies are mounted. A sealed bearing cartridge may inhibit airflow from entering the region of the frame 14 in which the bearings 74,76 are housed in use, which may reduce emissions.

Figure 13:
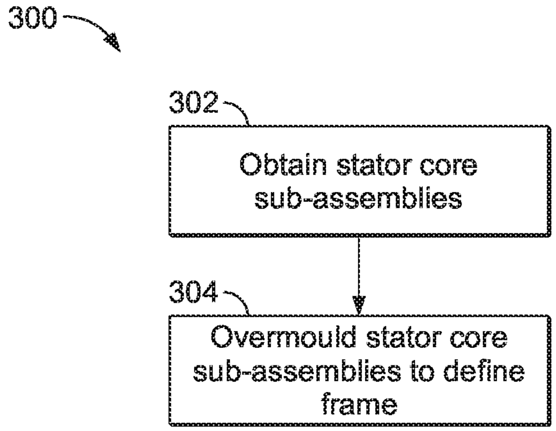
FIG. 13 is a flow diagram illustrating a second method of manufacturing a brushless permanent magnet motor.

A second method 300 of manufacturing the brushless permanent magnet motor 1 is illustrated in the flow diagram of FIG. 13.

The method 300 comprises obtaining 302 the plurality of stator core sub-assemblies 16, and overmoulding 304 the plurality of stator core sub-assemblies 16 to define the frame 14 such that at least a portion of the back 26 and the first 28 and second 30 arms of each stator core 20 is exposed through the frame 14.

As above, by overmoulding the stator core sub-assemblies 16 to define the frame 14, the need for the stator core sub-assemblies 16 to be individually adhered to the frame 14 may be removed, and this may provide a manufacturing process with fewer steps than a manufacturing process in which the stator core sub-assemblies 16 are individually adhered to the frame 14. Overmoulding the frame 14 to the stator core sub-assemblies 16 may, in some examples, provide increased thermal transfer from the stator core sub-assemblies 16 to the frame 14 compared to embodiments where stator core sub-assemblies 16 are adhered to the frame 14.

Overmoulding the frame 14 to the stator core sub-assemblies 16 may provide a brushless permanent magnet motor 1 having a greater overall stiffness than, for example, a brushless permanent magnet motor in which the stator core sub-assemblies are individually adhered to the frame.

However, overmoulding of the stator core sub-assemblies 16 may remove the stator core sub-assemblies 16 from a region of airflow through the brushless permanent magnet motor 1 in use, which may result in the stator cores 22 and/or the windings 24 experiencing increased temperatures in use. By overmoulding the frame 14 to stator core sub-assemblies 16 such that at least a portion of the back 26 and the first 28 and second 30 arms of each stator core 22 is exposed through the frame 14, at least a portion of each stator core 22 may be exposed to airflow through the brushless permanent magnet motor 1in use, which may provide a cooling effect, thereby reducing any increases in temperature experienced as a result of the overmoulding of the stator core sub-assemblies 16.

Figure 14:
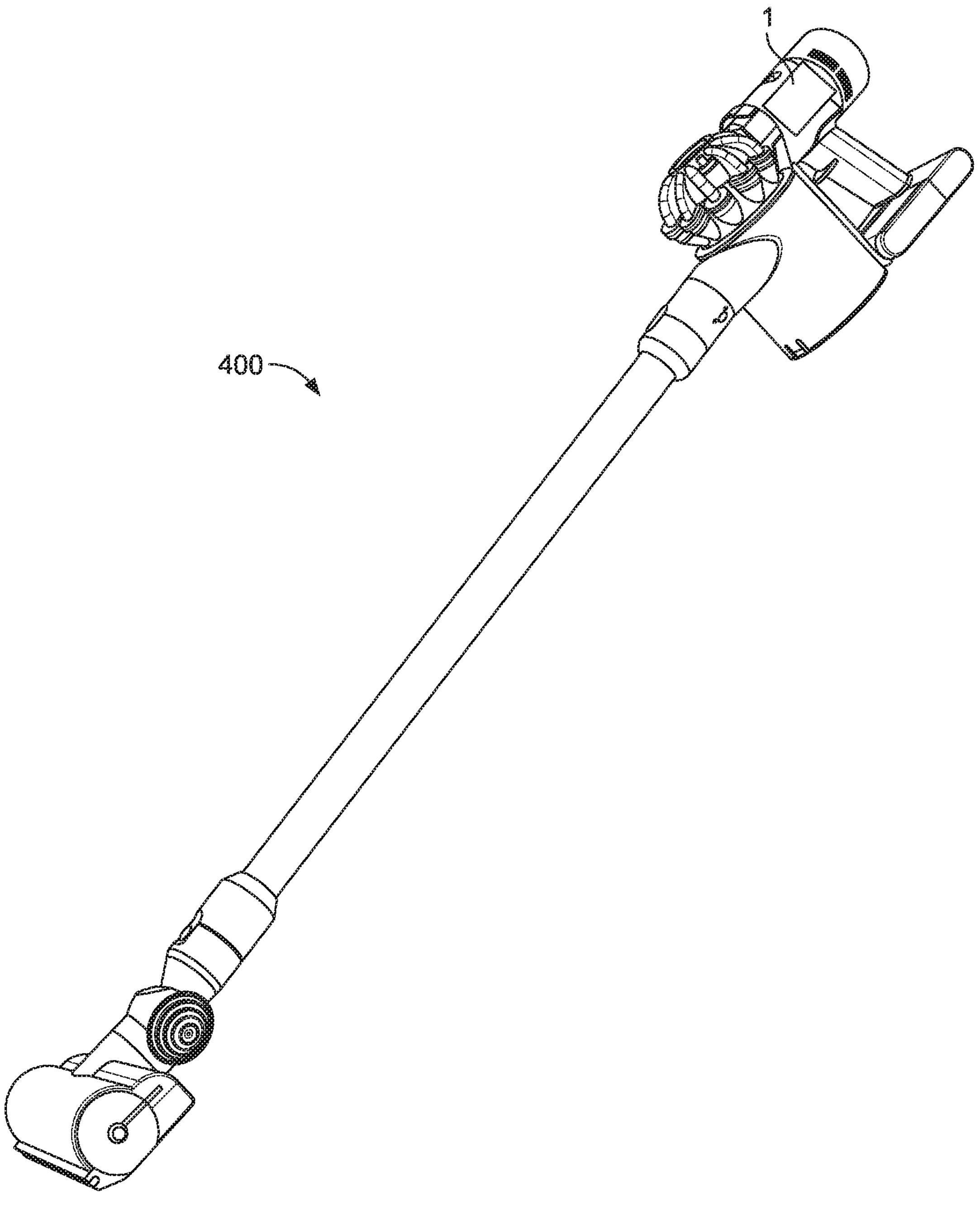
FIG. 14 is a schematic perspective view of a vacuum cleaner incorporating the brushless permanent magnet motor of FIG. 1.

The brushless permanent magnet motor 1 described herein may find particular utility in fields where small factor yet high power density is desirable. As an example, a vacuum cleaner comprising the brushless permanent magnet motor is illustrated schematically in FIG. 14.

Although described herein with a combination of features, it will be appreciated that embodiments of the brushless motor 1 where only some of the above-mentioned features are implemented are also envisaged. For example, the turbulators 112 may still find utility in an arrangement in which the shoulders of the stator cores 22 are not exposed by the frame 14.

The invention claimed is:

1. A brushless motor comprising a stator assembly, and a frame within which the stator assembly is housed, wherein the stator assembly comprises a plurality of stator core sub-assemblies each comprising a C-shaped stator core, a bobbin attached to the stator core, and a winding wound about the bobbin, each bobbin comprising a connection portion for connecting to an adjacent bobbin in the stator assembly, and the frame being overmoulded to the stator assembly.

2. The brushless motor as claimed in claim 1, wherein each bobbin is overmoulded to a respective stator core.

3. The brushless motor as claimed in claim 1, wherein the bobbins comprise a first material, and the frame comprises a second material different to the first material.

4. The brushless motor as claimed in claim 1, wherein each bobbin is overmoulded to a respective stator core in a respective first overmoulding process, and the frame is overmoulded to the stator assembly in a second overmoulding process different to the first overmoulding process.

5. The brushless motor as claimed in claim 1, wherein the stator assembly comprises first and second terminals to which the windings are attached, and a sleeve overmoulded to the first and second terminals.

6. The brushless motor as claimed in claim 5, wherein the first and second terminals are exposed through apertures in the sleeve, and the windings are attached to the first and second terminals through the apertures.

7. The brushless motor as claimed in claim 5, wherein the sleeve and the frame comprise the same material.

8. The brushless motor as claimed in claim 1, wherein the brushless motor comprises a rotor assembly, the rotor assembly comprises a shaft, a rotor core, a first bearing attached to a first end of the shaft, and a second bearing attached to a second end of the shaft opposite to the first end of the shaft, the frame defines first and second bearing seats for the respective first and second bearings, and a channel within which the rotor core is located.

9. The brushless motor as claimed in claim 1, wherein the frame is overmoulded to the stator assembly such that portions of the stator cores are exposed through the frame.

10. The brushless motor as claimed in claim 1, wherein the frame comprises a main body having protrusions, each protrusion overlying a respective stator core, and each protrusion comprising a region of increased radius relative to regions of the main body between adjacent stator cores of the stator assembly.

11. The brushless motor as claimed in claim 1, wherein each stator core comprises a back, and first and second arms extending from the back, and the frame is overmoulded to the stator assembly such that portions of the back and the first and second arms of each stator core are exposed through the frame.

12. The brushless motor as claimed in claim 1, wherein the frame comprises a plurality of turbulators.

13. The brushless motor as claimed in claim 12, wherein the turbulators are formed during a process of overmoulding the frame to the stator assembly.

14. The brushless motor as claimed in claim 12, wherein each stator core comprises a back, and the frame comprises a plurality of turbulators overlying the backs of the stator cores.

15. The brushless motor as claimed in claim 12, wherein the plurality of turbulators are obliquely angled relative to an axis substantially parallel to a central longitudinal axis of the brushless motor.

16. The brushless motor as claimed in claim 15, wherein a pitch to height ratio of each turbulator is in the region of 8:1 to 12:1.

17. The brushless motor as claimed in claim 15, wherein the plurality of turbulators comprise a plurality of pairs of turbulators, each pair of turbulators arranged in a generally V-shaped formation.

18. A vacuum cleaner comprising the brushless motor as claimed in claim 1.

19. A method of manufacturing a brushless motor, the method comprising:

obtaining a plurality of stator core sub-assemblies, each comprising a C-shaped stator core, a bobbin attached to the stator core, and a winding wound about the bobbin, each bobbin comprising a connection portion for connecting to an adjacent bobbin in the stator assembly;

connecting adjacent stator core sub-assemblies, via the connection portions of the bobbin, to form a stator assembly;

overmoulding the stator assembly to define a frame within which the stator assembly is housed.

20. The method as claimed in claim 19, wherein each bobbin is overmoulded to a respective stator core in a respective first overmoulding process, and the frame is overmoulded to the stator assembly in a second overmoulding process different to the first overmoulding process.

21. The method as claimed in claim 19, wherein the method comprises overmoulding a sleeve to first and second terminals, and attaching the windings to the terminals to form the stator assembly.

22. The method as claimed claim 21, wherein the sleeve comprises a same material as the frame, and the sleeve and the frame are formed in separate overmoulding processes.

* * * * *